(12) United States Patent
Anchan et al.

(10) Patent No.: US 8,929,399 B2
(45) Date of Patent: Jan. 6, 2015

(54) SELECTIVELY MULTIPLEXING COMMUNICATION STREAMS

(71) Applicant: QUALCOMM Incorporated, San Diego, CA (US)

(72) Inventors: Kirankumar Anchan, San Diego, CA (US); Mark A Maggenti, San Diego, CA (US); Yih-Hao Lin, Santa Clara, CA (US); Arvind Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 13/726,604

(22) Filed: Dec. 25, 2012

(65) Prior Publication Data

US 2013/0170424 A1 Jul. 4, 2013

Related U.S. Application Data

(60) Provisional application No. 61/581,581, filed on Dec. 29, 2011.

(51) Int. Cl.
*H04J 3/24* (2006.01)
*H04L 29/06* (2006.01)
*H04W 4/06* (2009.01)

(52) U.S. Cl.
CPC ............. *H04W 4/06* (2013.01); *H04L 65/4061* (2013.01); *H04L 69/22* (2013.01); *H04L 65/4076* (2013.01)
USPC .......................................... 370/474; 370/235

(58) Field of Classification Search
CPC ......... H04L 47/10; H04L 47/30; H04L 41/11; H04L 47/12; H04L 47/15; H04L 47/70; H04L 47/2414; H04L 2012/5631; H04L 29/0653; H04L 2012/5652; H04J 3/076

USPC ........ 370/229, 230, 235, 472, 470, 464, 471, 370/473, 474, 475
See application file for complete search history.

(56) References Cited

U.S. PATENT DOCUMENTS 5,852,606 A 12/1998 Prince et al.
6,754,216 B1 6/2004 Wong et al.
(Continued)

FOREIGN PATENT DOCUMENTS

EP 1217797 A1 6/2002

OTHER PUBLICATIONS

International Search Report and Written Opinion—PCT/US2012/071997—ISA/EPO—Mar. 13, 2013.

*Primary Examiner* — Dady Chery
(74) *Attorney, Agent, or Firm* — Michael F. Taveira

(57) ABSTRACT

In an embodiment, a network device obtains a plurality of data packets that are each associated with one of a plurality of different streams, wherein each of the plurality of obtained data packets includes a header portion with stream-specific routing information. The network device strips the stream-specific routing information from the plurality of obtained data packets to produce a plurality of stream-specific payload portions, which are merged into a shared payload portion of a stream-multiplexed data packet that includes common routing information for the plurality of streams in a common header portion. The network device transmits the stream-multiplexed packet to a target device, and the target device determines whether any of the plurality of different streams are relevant to the target UE based on stream-mapping information contained in the stream-multiplexed packet, and selectively decodes and processes the stream-specific payload portions corresponding based on the determination.

54 Claims, 15 Drawing Sheets

(56) References Cited

U.S. PATENT DOCUMENTS

| | | |
|---|---|---|
| 6,865,155 B1 | 3/2005 | Wong et al. |
| 6,925,092 B1 | 8/2005 | Derks et al. |
| 6,963,563 B1 | 11/2005 | Wong et al. |
| 2005/0043035 A1 | 2/2005 | Diesen et al. |
| 2005/0100022 A1* | 5/2005 | Ramprashad ............ 370/395.42 |
| 2008/0232361 A1 | 9/2008 | Kimiyama et al. |
| 2009/0238106 A1 | 9/2009 | Ulupinar et al. |
| 2009/0285096 A1 | 11/2009 | Yousef |
| 2011/0216666 A1 | 9/2011 | Radhakrishnan et al. |
| 2011/0228716 A1 | 9/2011 | Xue et al. |
| 2012/0014396 A1* | 1/2012 | Bae ............................... 370/474 |
| 2013/0170450 A1 | 7/2013 | Anchan et al. |

* cited by examiner

SELECTIVELY MULTIPLEXING COMMUNICATION STREAMS

CLAIM OF PRIORITY UNDER 35 U.S.C. §119

The present Application for Patent claims priority to Provisional Application No. 61/581,581 entitled "SELECTIVELY MULTIPLEXING COMMUNICATION STREAMS", filed Dec. 29, 2011, and assigned to the assignee hereof and hereby expressly incorporated by reference herein.

CROSS REFERENCE TO RELATED APPLICATIONS

The present Application for Patent is also related to U.S. application Ser. No. 13/726,602, entitled "WIRELESS BROADCAST/MULTICAST SERVICE CAPACITY OVER DIFFERENT LINK BUDGETS AND OVERLAY", filed on the same date as the subject application, assigned to the assignee hereof and hereby expressly incorporated by reference herein.

FIELD OF DISCLOSURE

The present disclosure relates generally to communication, and more specifically to techniques for selectively multiplexing group communication streams for broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using unicast, broadcast, multicast or a combination thereof. As the group becomes larger it is generally more efficient to use multicast services. However, for group communication services that require low latency and a short time to establish the group communication, the setup time of conventional multicast channels can be a detriment to system performance.

SUMMARY

In an embodiment, a network device obtains a plurality of data packets that are each associated with one of a plurality of different streams, wherein each of the plurality of obtained data packets includes a header portion with stream-specific routing information. The network device strips the stream-specific routing information from the plurality of obtained data packets to produce a plurality of stream-specific payload portions, which are merged into a shared payload portion of a stream-multiplexed data packet that includes common routing information for the plurality of streams in a common header portion. The network device transmits the stream-multiplexed packet to a target device, and the target device determines whether any of the plurality of different streams are relevant to the target UE based on stream-mapping information contained in the stream-multiplexed packet, and selectively decodes and processes the stream-specific payload portions corresponding based on the determination.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
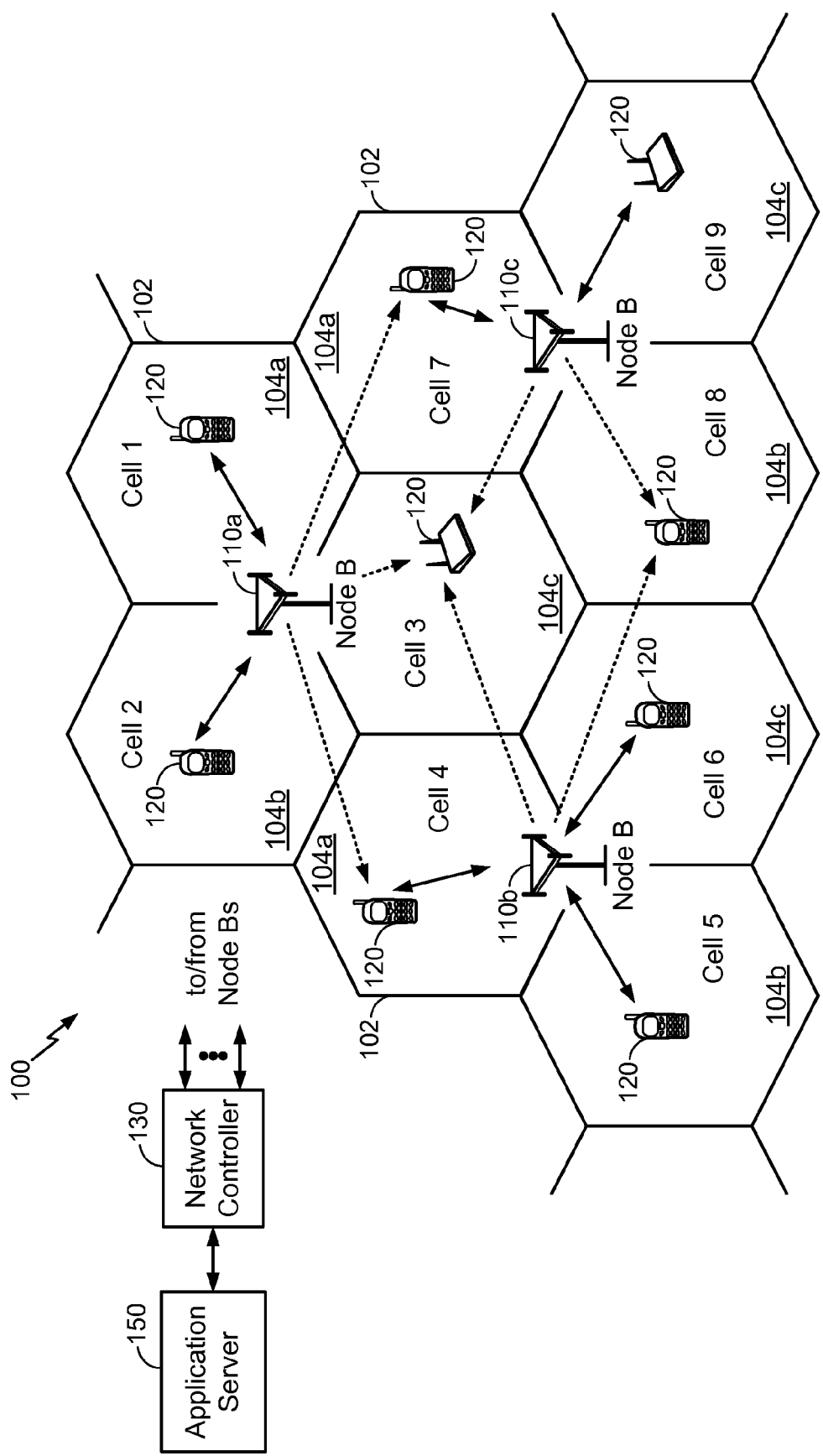
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Access network 100 may also include other network entities not shown in FIG. 1. Further, as illustrated network controller may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
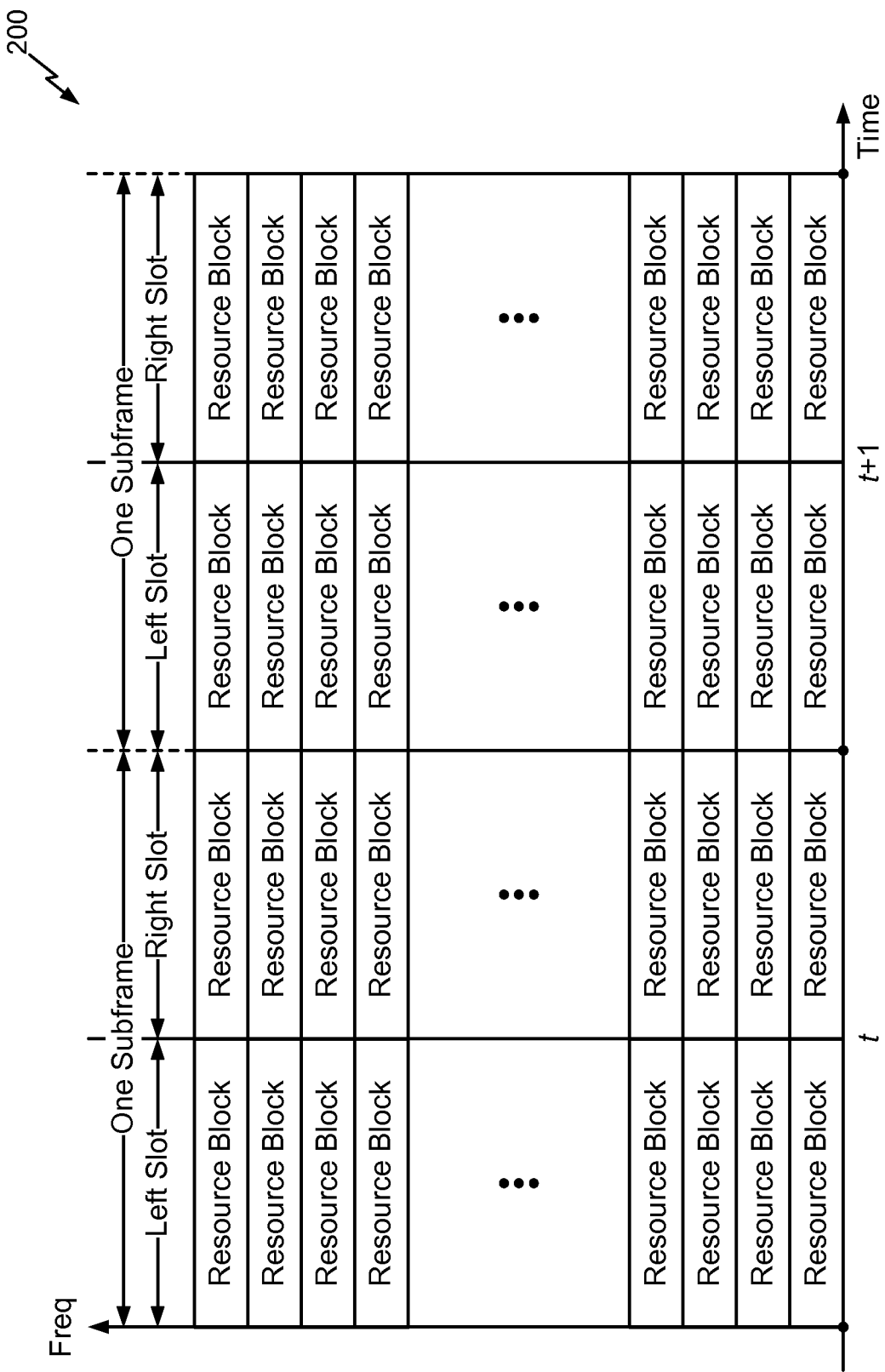
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| E-MBMS Traffic Channel | MTCH | L | Carry configuration information for E-MBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:

Content for broadcast or multicast services can be transmitted synchronously across multiple cells.
Radio resources for broadcast and multicast services are allocated by an MBMS Coordinating Entity (MCE), which may be logically located above the Node Bs.
Content for broadcast and multicast services is mapped on the MCH at a Node B.
Time division multiplexing (e.g., at sub frame level) of data for broadcast, multicast, and unicast services.

The single-cell mode may have the following characteristics:

Each cell transmits content for broadcast and multicast services without synchronization with other cells.
Radio resources for broadcast and multicast services are allocated by the Node B.
Content for broadcast and multicast services is mapped on the DL-SCH.
Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
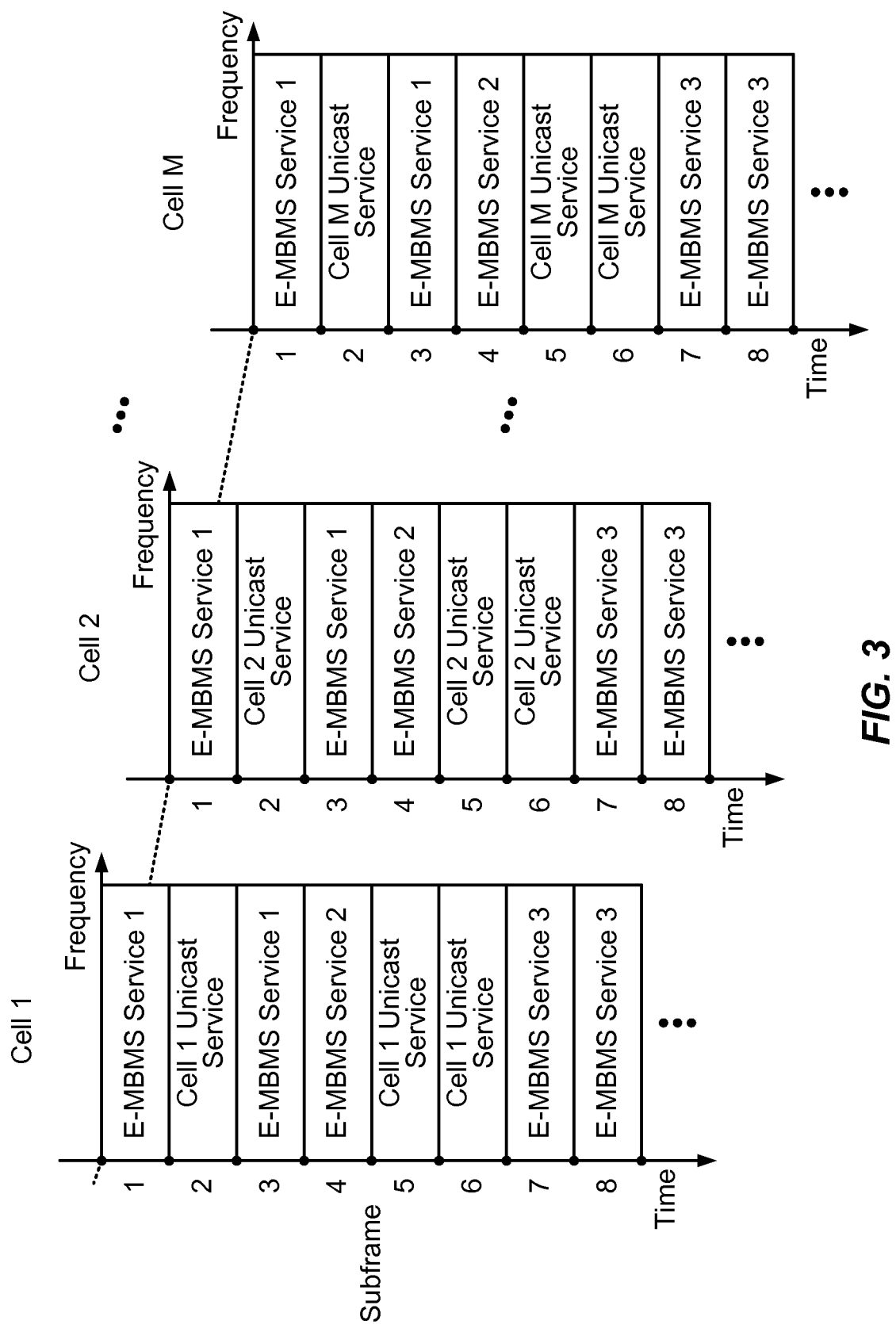
FIG. 3 illustrates example transmissions of different services in a multi-cell mode.

FIG. 3 shows example transmissions of E-MBMS and unicast services by M cells 1 through M in the multi-cell mode, where M may be any integer value. For each cell, the horizontal axis may represent time, and the vertical axis may represent frequency. In one design of E-MBMS, which is assumed for much of the description below, the transmission time line for each cell may be partitioned into time units of sub frames. In other designs of E-MBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three E-MBMS services 1, 2 and 3. All M cells transmit E-MBMS service 1 in sub frames 1 and 3, E-MBMS service 2 in sub frame 4, and E-MBMS service 3 in sub frames 7 and 8. The M cells transmit the same content for each of the three E-MBMS services. Each cell may transmit its own unicast service in sub frames 2, 5 and 6. The M cells may transmit different contents for their unicast services.

Figure 4:
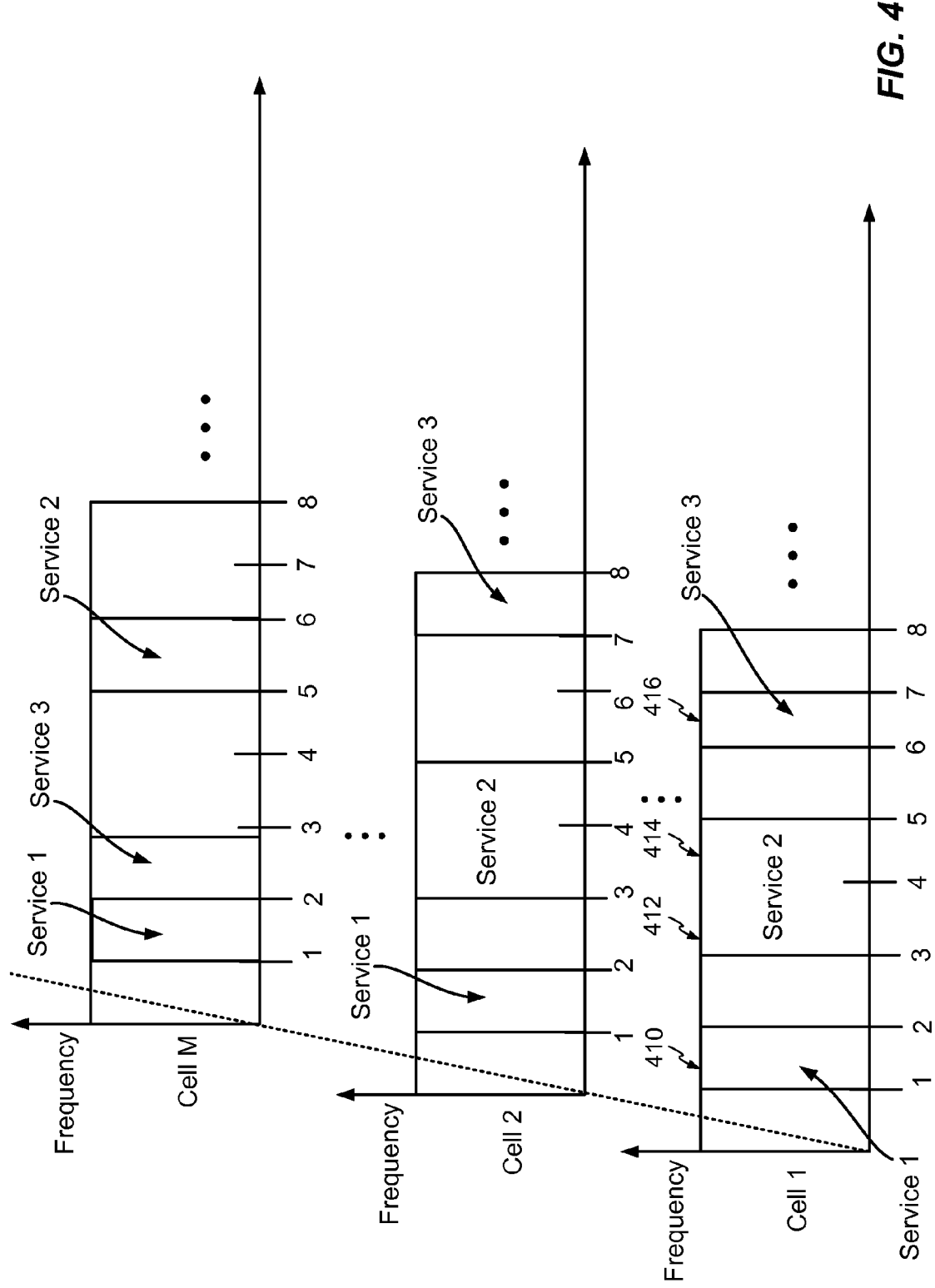
FIG. 4 illustrates example transmissions of different services in a single-cell mode.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in one time frequency block 410, E-MBMS service 2 in a time frequency blocks 412 and 414, and E-MBMS service 3 in one time frequency blocks 416. Similarly other cells transmit services 1, 2 and 3 as shown in the FIG. 4.

In general, an E-MBMS service may be sent in any number of time frequency blocks. The number of sub frames may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM).

As noted in the foregoing, E-MBMS services can be used to distribute multicast data to groups and could be useful in group communication systems (e.g., Push-to-Talk (PTT) calls). Conventional applications on E-MBMS have a separate service announcement/discovery mechanism. Further, communications on pre-established E-MBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 5A:
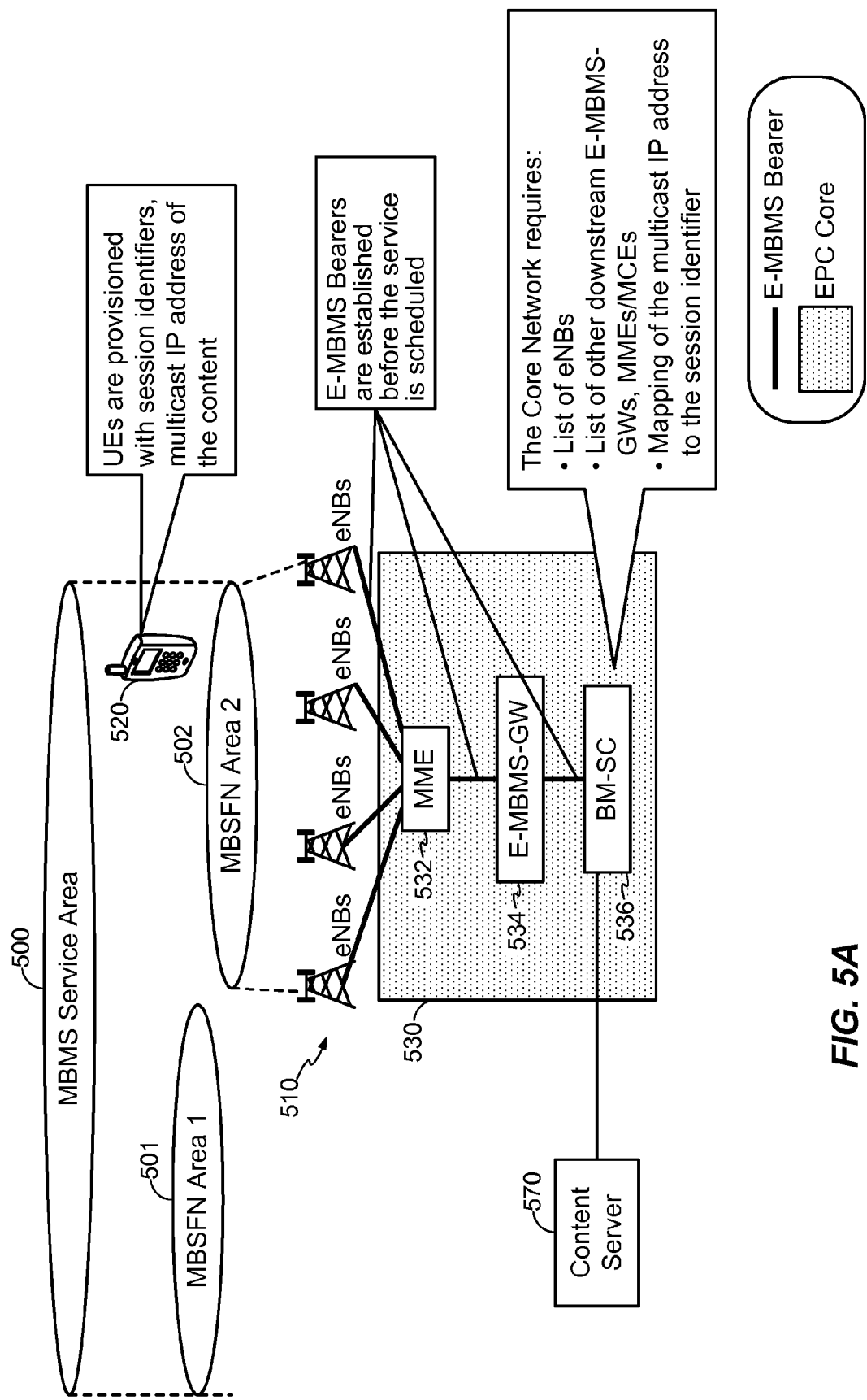
FIGS. 5A and 5B illustrate additional wireless communication systems that can support broadcast/multicast services.

FIG. 5A is another illustration of a wireless network that can implement evolved multimedia broadcast/multicast services (E-MBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 520 can include various elements (e.g., MME 532, E-MBMS gateway 534, and broadcast multicast service center (BM-SC) 536 to facilitate controlling and distributing the content from content provider 570 (which may include an application server, etc.) to the MBMS service area 500.

Figure 5B:
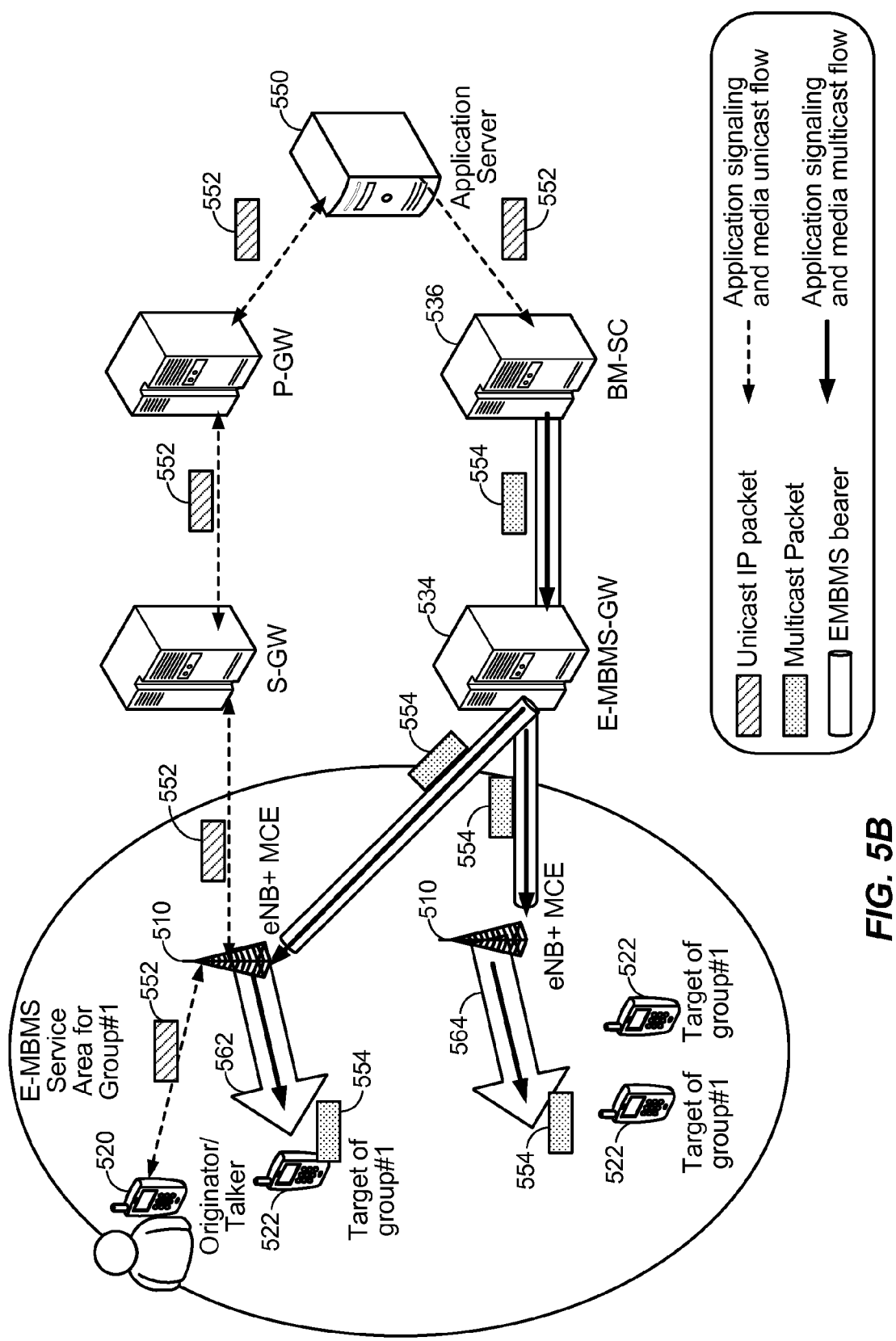

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC 536 to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved packet system (EPS) bearer will be established (and persistently on) between the BM-SC 536, EMBS GW 534, eNBs 510 and target UEs 522.

In accordance with various embodiments disclosed herein some of the downlink channels related to E-MBMS will be further discussed, which include:
MCCH: Multicast Control Channel;
MTCH: Multicast Traffic Channel;
MCH: Multicast Channel; and
PMCH: Physical Multicast Channel.

It will be appreciated that multiplexing of E-MBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one E-MBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate E-MBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of a particular MTCH within a sub frame. An MCH Scheduling Information (MSI) MAC control element is included in the first sub frame allocated to the MCH within the MCH scheduling period to indicate the position of each MTCH and unused sub frames on the MCH. For E-MBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
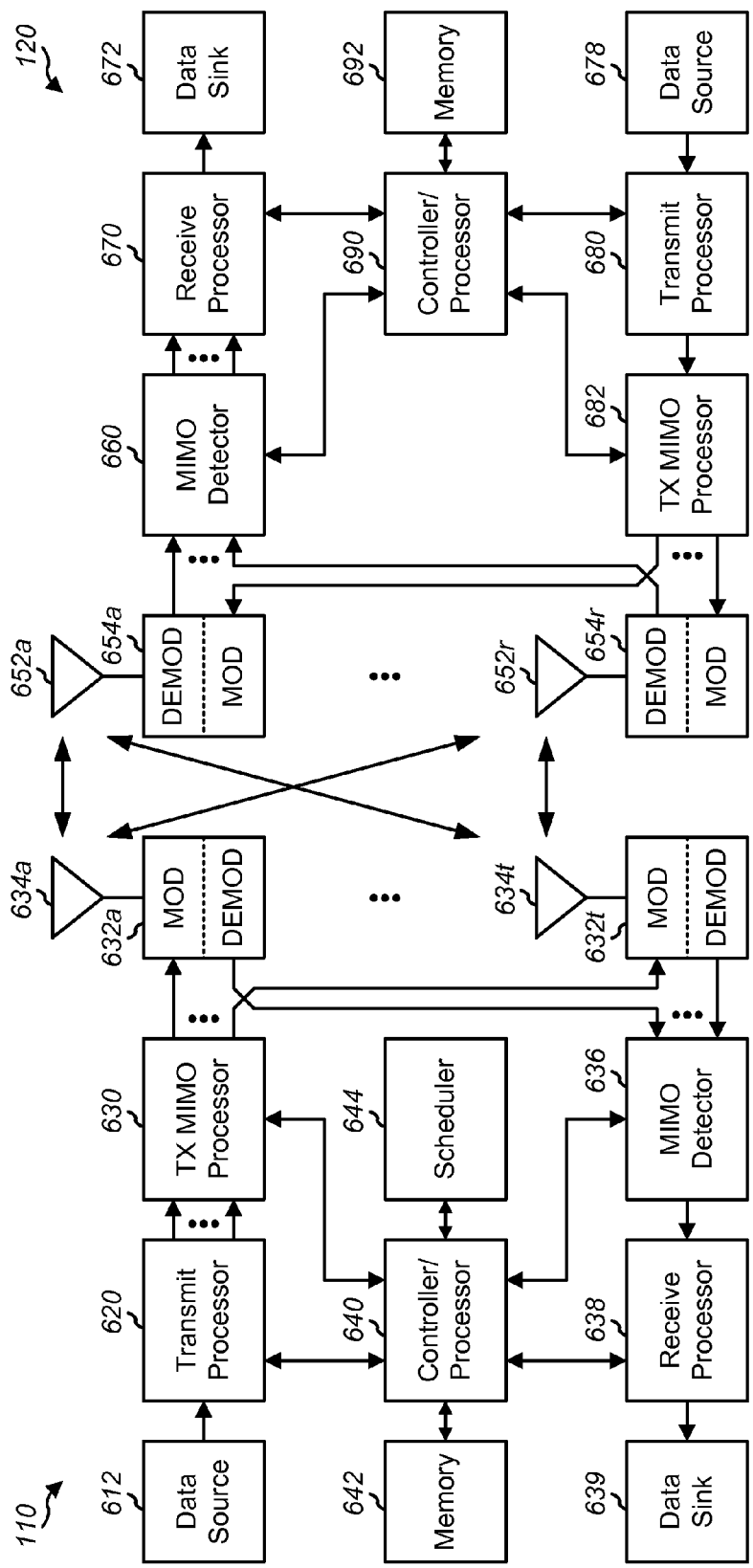
FIG. 6 illustrates a block diagram of a portion of a wireless communication system that can support broadcast/multicast services.

FIG. 6 illustrates a block diagram of a design of an eNode B 110 and UE 120, which may be one of the eNode Bs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 150). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively.

Figure 7:
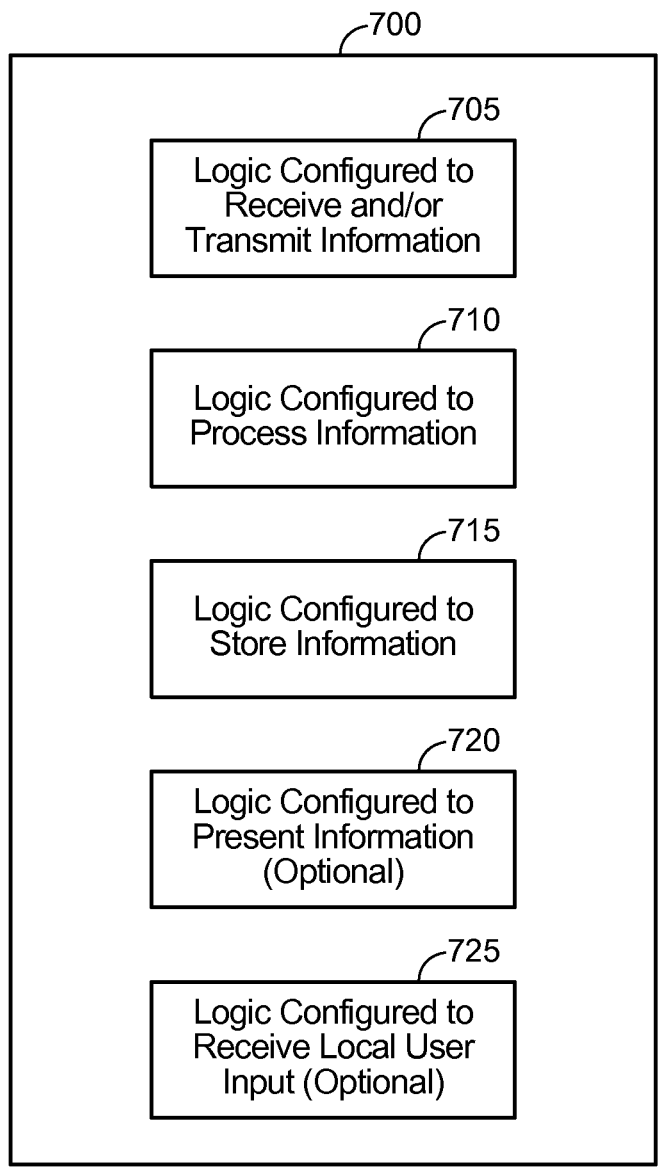
FIG. 7 illustrates a communication device in accordance with an embodiment of the present invention.

FIG. 7 illustrates a communication device 700 that includes logic configured to perform functionality. The communication device 700 can correspond to any of the above-noted communication devices, including but not limited to Node Bs 110 or 510, UEs 120 or 520, the application server 150, the network controller 130, the BM-SC 536, the content server 570, MME 532, E-MBMS-GW 532, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, Node B 110, etc.), the logic configured to receive and/or transmit information 705 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., the application server 150, the network controller 130, the BM-SC 536, the content server 570, MME 532, E-MBMS-GW 532, etc.), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM memory, flash memory, ROM memory, EPROM memory, EEPROM memory, registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to display information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 120 or 520, the logic configured to present information 720 can include a display screen and an audio output device (e.g., speakers). In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 120 or 520, the logic configured to receive local user input 725 can include a display screen (if implemented a touch-screen), a keypad, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710. Further, the configured logics or "logic configured to" of 705 through 725 are not limited to specific logic gates or elements, but generally refer to the ability to perform the functionality describe herein (either via hardware or a combination of hardware and software). Thus, the configured logics or "logic configured to" of 705 through 725 are not necessarily implemented as logic gates or logic elements despite sharing the word "logic". Other interactions or cooperation between the configured logics 705 through 725 will become clear to one of ordinary skill in the art from a review of the embodiments described below in more detail.

Conventionally, different streams in an E-MBMS service over cellular/wireless networks share over the air (OTA) resources and network links. However, when multiple data streams are broadcasted/multicasted over the same target area (or MSFBN), each application stream is allocated its own transport and network headers, e.g. IP and TCP/UDP headers. These network and transport headers consume a considerable proportion of the available bandwidth on both network and transport layers. This bandwidth overhead limits the actual application payload or the number of different application streams that can be supported over this bandwidth. Given the knowledge that multiple streams having a common link, embodiments of the present invention are directed to reducing and/or eliminating certain network and transport headers to improve bandwidth efficiency and to improve the application payload or the number of application streams within the same bandwidth.

Figure 8:
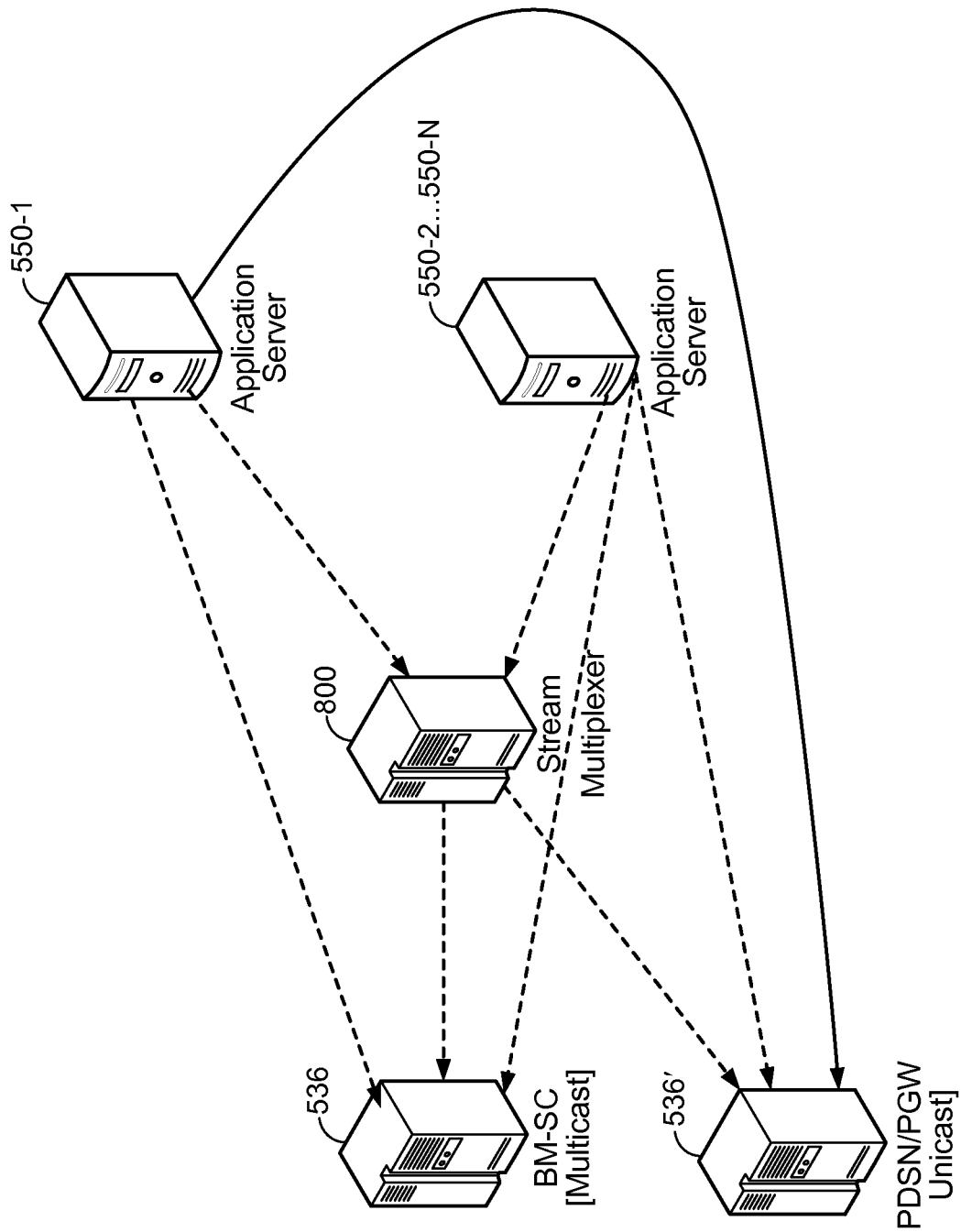
FIG. 8 illustrates an example interface between a set of application servers, a broadcast multicast service center and a packet data serving node or packet data network gateway in accordance with an embodiment of the invention.

FIG. 8 illustrates an example interface between the application server 550, the BM-SC 536 and a packet data serving node or packet data network gateway (PDSN/PGW) 536' in accordance with an embodiment of the invention. In particular, in FIG. 8, the application server 550 from FIG. 5B is illustrated as a plurality of different application servers 550-1 . . . 550-N, where N>1. Each of the application servers 550-1 . . . 550-N is associated with a different E-MBMS and/or unicast service. For example, application server 550-1 may be configured to support a dispatch service for emergency responders in a given geographic area, application server 550-2 may be configured to support delivery of media content programs or channels in a given geographic area (e.g., ESPN, HBO, etc.), and so on.

In FIG. 5B, the application server 550 is shown as having a direct connection to the BM-SC 536, implying that each application server 550 has its own IP/UDP connection to the BM-SC 536. In FIG. 8, the application servers 550-1 . . . 550-N have the direct connection to the BM-SC 536 as in FIG. 5B but the application servers 550-1 . . . 550-N are also connected to a stream multiplexer 800 and the PDSN/PGW 536'. The stream multiplexer 800 can be implemented as a remote or independent server or as a part of the application server 550. As will be described below in more detail with respect to FIGS. 9A-9B, the stream multiplexer 800 is configured to selectively multiplex multiple E-MBMS streams (or flows) from a single application server or different application servers onto a single IP/UDP link for delivery to the BM-SC 536, or alternatively to selectively multiplex multiple unicast streams (or flows) from one or more application servers onto a single IP/UDP link for delivery to the PDSN/PGW 536'. This permits multiple E-MBMS streams to share a common temporary mobile group identity (TMGI), a common IP/UDP link and thereby, at the individual eNode Bs, a common physical channel resource (i.e., a common sub frame). Also, this permits multiple unicast streams to share a common IP/UDP link and thereby, at the individual eNode Bs, a common physical channel resource (i.e., a common sub frame). As will be described in greater detail below, unicast or multicast data deemed by the application server(s) to warrant multiplexing can be routed to the stream multiplexer 800, which multiplexes the incoming data and then forwards multiplexed data to the target BM-SC 536 or PDSN/PGW 536'. On the other hand, unicast or multicast data deemed by the application server(s) not to warrant multiplexing (at least, within one or more target areas for transmission) can be forwarded directly to the target BM-SC 536 or PDSN/PGW 536'.

Figure 9A:
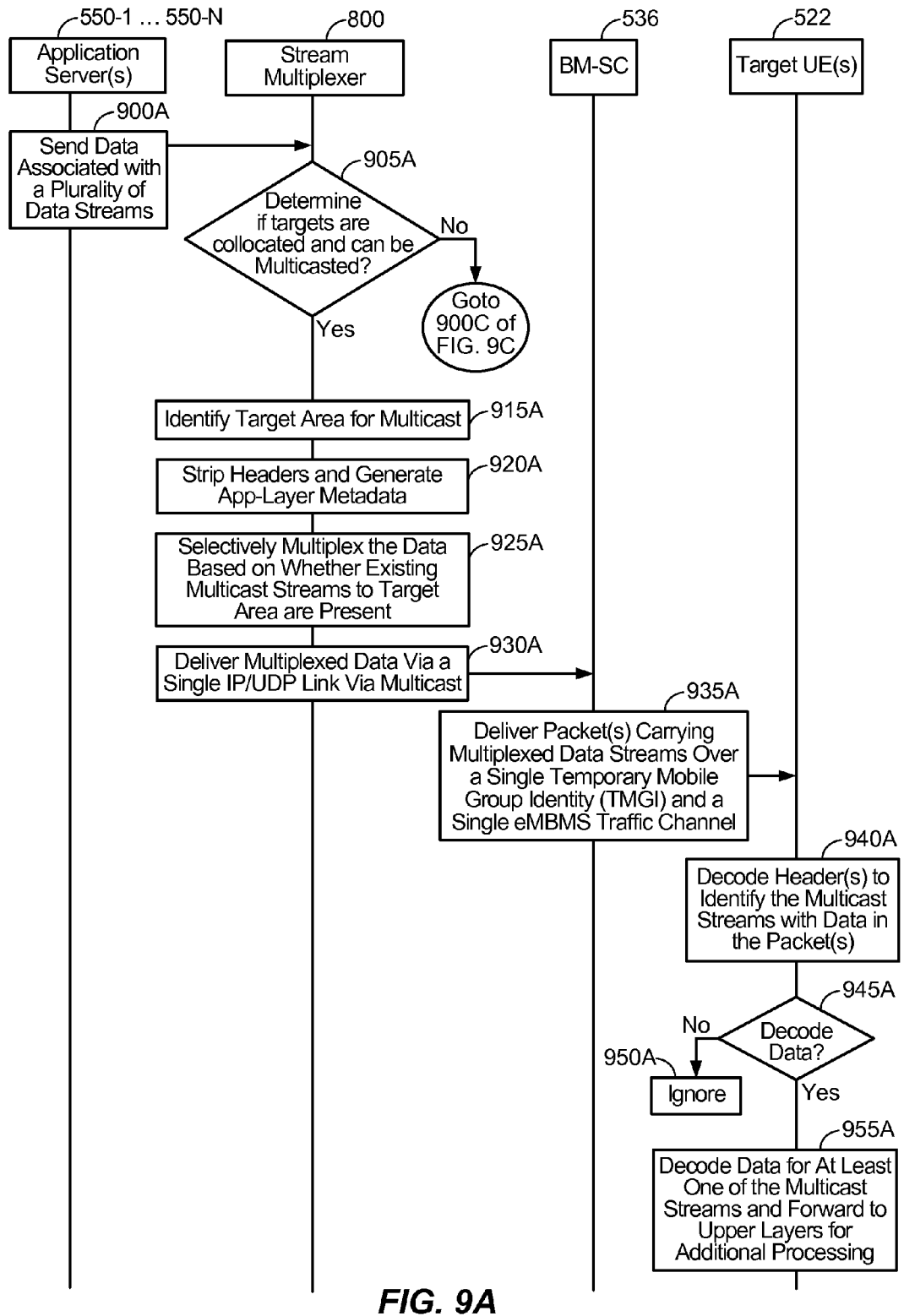
FIGS. 9A and 9B illustrate an example of multiplexing data associated with different data streams onto a single multicast stream in accordance with an embodiment of the present invention.
Figure 9B:
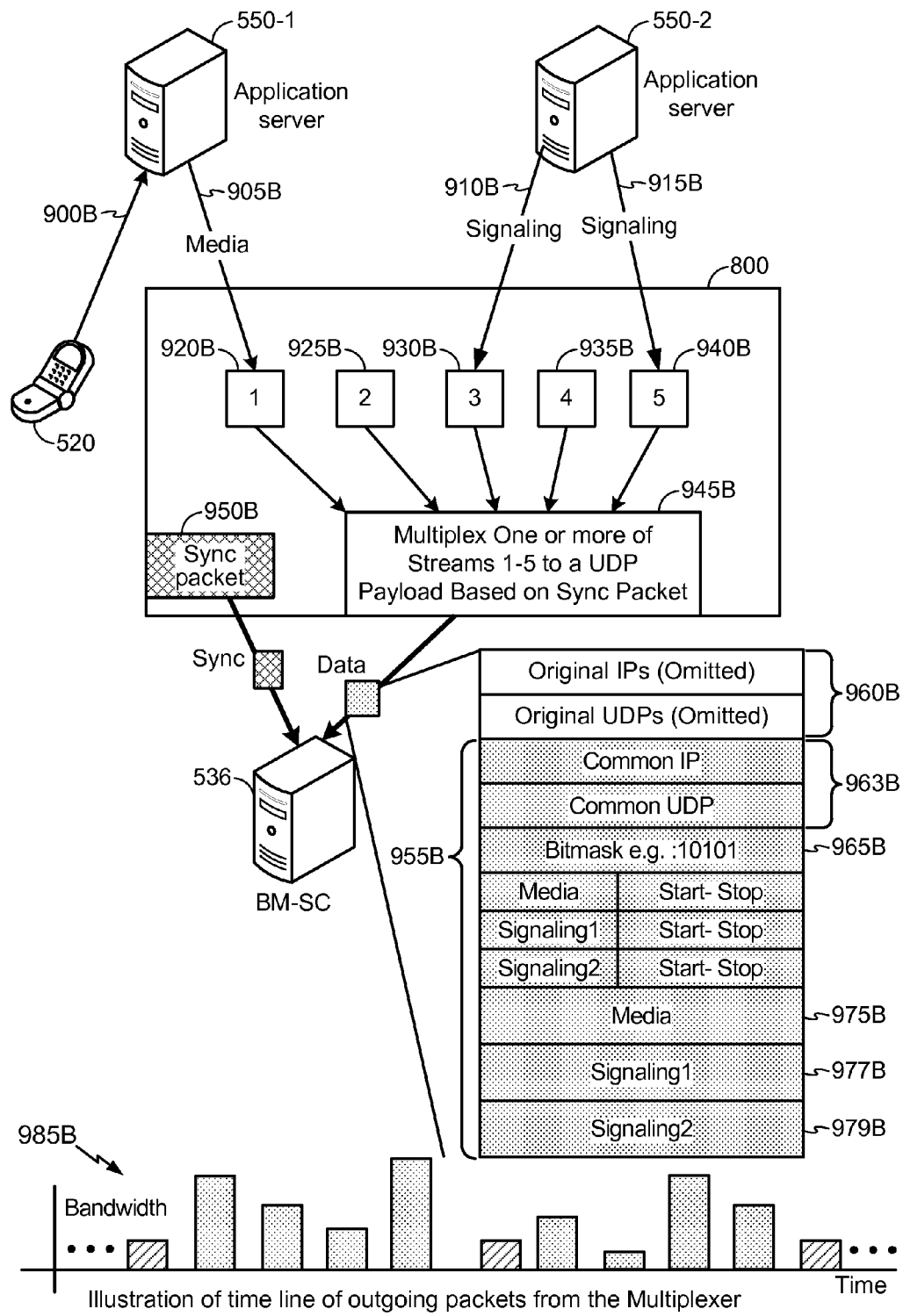

FIGS. 9A and 9B illustrate an example of multiplexing data associated with different data streams onto a single multicast stream in accordance with an embodiment of the present invention.

Referring to FIG. 9A, the application servers 550-1 . . . 550-N provide data associated with a plurality of different data streams to the stream multiplexer 800, 900A. For example, the plurality of different data streams provided at 900A can be associated with a single E-MBMS service (e.g., media and control parts), different E-MBMS services, unicast services, etc. FIG. 9B illustrates an example of how 900A of FIG. 9A can be implemented, whereby an originating UE 520 provides unicast media to the application server 550-1 for transmission to a multicast group as an E-MBMS stream, 900B, and the application server 550-1 then forwards the unicast media to the stream multiplexer 800, 905B. Also, signaling information associated with the E-MBMS stream can be sent by the application server 550-2, 910B and 915B.

After receiving the data associated with the plurality of data streams, the stream multiplexer 800 determines whether to transmit the respective streams to the target UE(s) via multicast or unicast, 905A. This determination is based on whether the target UE(s) are collocated and are able to receive multicast traffic. If the stream multiplexer 800 determines to transmit via IP unicast in 905A, then the process advances to 900C of FIG. 9C and the incoming data is multiplexed and then transmitted to the target UE(s) via unicast. Alternatively, if the stream multiplexer 800 determines to transmit via IP multicast in 905A, the stream multiplexer 800 identifies a target area for the multicasting of the respective data streams, 915A. For example, at 915A, the stream multiplexer 800 may determine to direct a first data stream to MBSFN 1, to direct a second data stream to MBSFN 1, to direct a third data stream to MBSFN 2, and so on.

Referring to FIG. 9A, it will be appreciated that the data packets for each respective data stream that arrives at 900A are associated with their own stream-specific IP and UDP addresses. In the embodiment of FIG. 9A, instead of simply forwarding these data packets to the BM-SC 536 separately with their stream-specific IP and UDP addresses intact, the IP and UDP headers for data packets of separate data streams that are targeted to the same MBSFN area are stripped or removed at 920A. Then, in 925A, the payload portions of the stripped data packets are merged into a single data packet with a common IP/UDP address. Further, in 925A, if there are existing multicast streams already being delivered to same target MBSFN area as the stripped data packets, the stripped data packets can further be merged with these existing multicast streams as well. As will be appreciated, merging the payloads of the data packets from multiple multicast streams reduces the overhead associated with sending each of these data streams with separate headers having their own IP/UDP addresses.

The multiplexing procedure of 925A is shown in more detail within FIG. 9B. Referring to FIG. 9B, the media and signaling streams 905B through 915B arrive at the stream multiplexer 800 and, along with other incoming data streams (not shown), are added to stream buffers 920B through 940B. The stream multiplexer 800 selectively merges the data payloads from these buffered packets into packets with common IP/UDP addresses for delivery to the BM-MS 536, 945B. In the embodiment of FIG. 9B, with the assumption that the media stream 905B and the signaling streams 910B and 915B are targeted to the same target MBSFN area, these media streams are multiplexed at 945B. This selective multiplexing can be conveyed to target UEs via a sync packet 950B, in an example, which can be generated by logic at the stream multiplexer 800 responsible for identifying and comparing the respective target MBSFN areas for the incoming data streams. As will be described in more detail below, the sync packet 950B can be sent to target UEs of the associated multiplexed data streams in an event-driven manner (e.g., each time the multiplexing format changes, such as when a data stream is added or removed, the data streams are re-arranged, the bitmask mapping changes, etc.) and/or periodically.

In FIG. 9B, 955B illustrates an example of a merged or multiplexed packet for a particular multicast stream. As shown in FIG. 9B, the original IP/UDP addresses 960B from the incoming data packet at the stream multiplexer 800 are removed and replaced with common IP/UDP addresses 963B for all of the respective data payloads contained therein. The multiplexed packet 955B further includes a bitmask 965B that instructs a target UE with respect to the sources of the respective payload portions of the multiplexed IP/UDP packet 955B. For example, the bitmask 965B indicates that the payload portion 975B is associated with multicast stream 1 (e.g., media payload data), that the payload portion 977B is associated with multicast stream 2 (e.g., signaling payload data), that the payload portion 979B is associated with multicast stream 3 (e.g., signaling payload data), and so on.

Returning to FIG. 9A, after selectively multiplexing the data streams in 925A, the stream multiplexer 800 delivers the multiplexed data packet(s) to the BM-SC 536, 930A. The BM-SC 536 in turn delivers the multiplexed data packet(s) to their respective target MBSFN areas, 935A. At least one target UE 522 within the target MBSFN area(s) receives and decodes the header of the multiplexed data packet, 940A. Based on the header decoding from 940A, the target UE determines whether it is a target for one or more of the payload portions contained therein, 945A. For example, the target UE can evaluate the bitmask 965B from the header of the multiplexed data packet to identify the service(s) associated with the respective payload portions, and then determine whether the UE is interested in the associated service(s). As discussed above, the sync packets 950B provide the mapping of bits in the Bitmask to the stream identifying information. Moreover when a new stream is multiplexed or removed from multiplexing, the sync packet 950B is sent to update the mapping. For example, when data for a particular stream is included, a corresponding bit-position of the bitmask 965B is set to 1. Thus, bit position #1 in 965B is set to 1 to indicate that media stream 920B has data in the multiplexed packet, bit position #2 in 965B is set to 0 to indicate that stream 925B does not have data in the multiplexed packet, and so on. In FIG. 9B, timeline 985B shows the transmission of the sync packets 950B along with the transmission of multiplexed packets (with varying payload levels based in part upon the number of streams being multiplexed in a particular packet). Referring to FIG. 9A, if the target UE determines that it is not interested in any of the payloads contained in the multiplexed data packet in 945A, the target UE ignores the multiplexed data packet and does not decode it further, 950A. Otherwise, if the target UE determines that it is interested in at least one of the payloads contained in the multiplexed data packet in 945A, the target UE decodes the relevant payload portions and forwards the decoded payload portions to upper layers of the target UE for further processing, 955A.

Figure 9C:
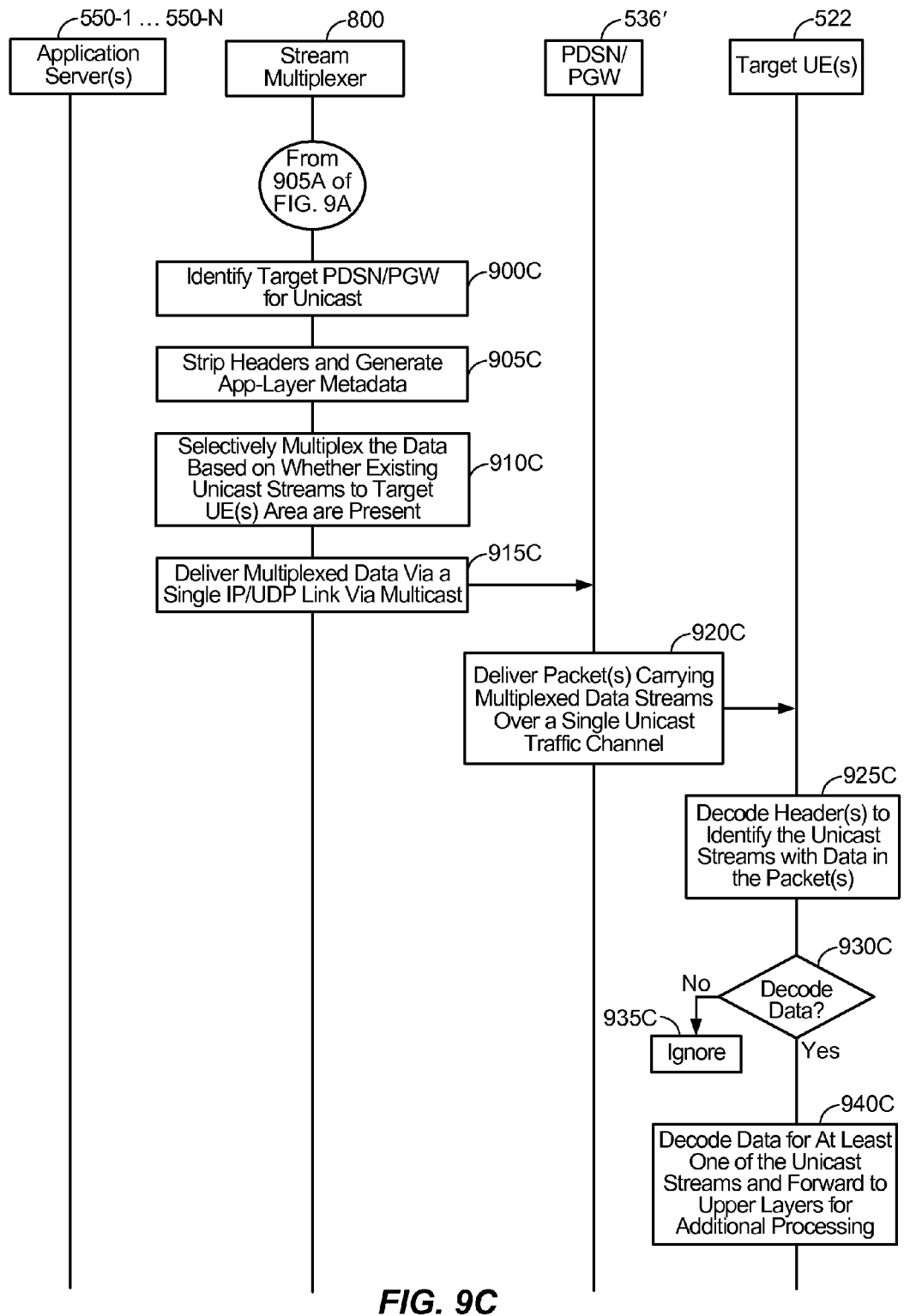
FIGS. 9C and 9D illustrate an example of multiplexing data associated with different data streams onto a single unicast stream in accordance with an embodiment of the present invention.
Figure 9D:
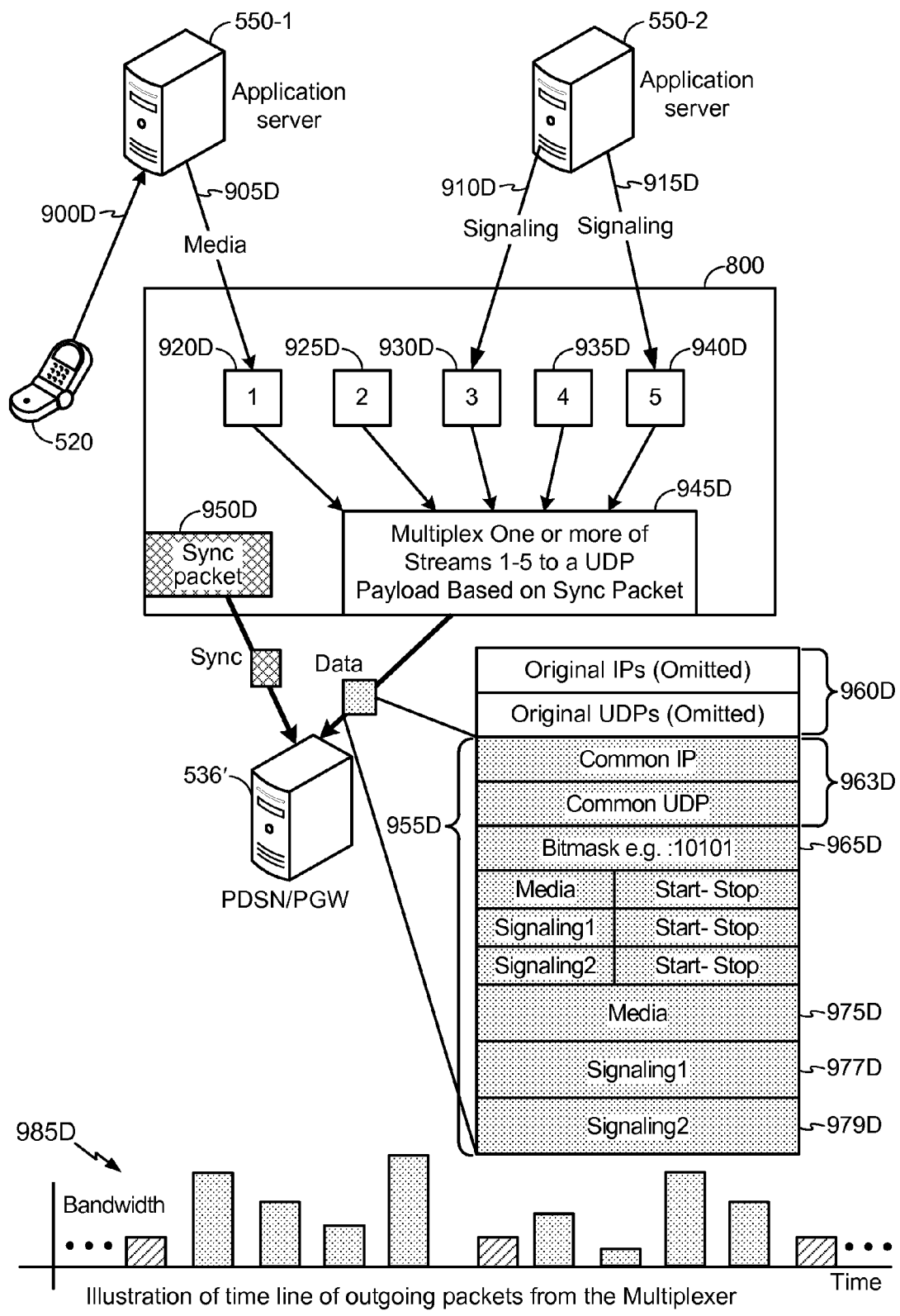

FIGS. 9C and 9D illustrate an example of multiplexing data associated with different data streams onto a single unicast stream in accordance with an embodiment of the present invention. In particular, FIG. 9C illustrates a procedure of multiplexing data streams in the event that the stream multiplexer determines to transmit via IP unicast instead of IP unicast (e.g., if the target UEs are not sufficiently collocated).

Referring to FIG. 9C, after determining to transmit a set of data streams to be multiplexed via unicast in 905A of FIG. 9A, the stream multiplexer 800 identifies a target PDSN/PGW 536' for the unicast transmission, 900C.

Referring to FIG. 9C, similar to 920A of FIG. 9A, it will be appreciated that the data packets for each respective data stream that arrives at 900A are associated with their own stream-specific IP and UDP addresses. In the embodiment of FIG. 9C, instead of simply forwarding these data packets to the PDSN/PGW 536' separately with their stream-specific IP and UDP addresses intact, the IP and UDP headers for data packets of separate data streams that are targeted to the same target UE(s) are stripped or removed at 905C. Then, in 910C, the payload portions of the stripped data packets are merged into a single unicast data packet with a common IP/UDP address. Further, in 910C, if there are existing unicast streams already being delivered to same target UE(s) as the stripped data packets, the stripped data packets can further be merged with these existing unicast streams as well. As will be appreciated, merging the payloads of the data packets from multiple unicast streams reduces the overhead associated with sending each of these data streams with separate headers having their own IP/UDP addresses.

The multiplexing procedure of 910C is shown in more detail within FIG. 9D. FIG. 9C is identical to FIG. 9B except that the BM-SC 536 from FIG. 9B is replaced with the PDSN/PGW 536' in FIG. 9D to show that the multiplexed unicast data packets are forwarded to the PDSN/PGW 536' for transmission to their target UEs, instead of the BM-SC 536 which receives multicast of MBMS traffic. Aside from the unicast and multicast distinction, FIG. 9D is very similar to FIG. 9B and irrespective of whether the payloads are intended for multicast or unicast transmission, the respective multiplexing can occur in similar fashion.

Returning to FIG. 9A, after selectively multiplexing the data streams in 910C, the stream multiplexer 800 delivers the multiplexed data packet(s) to the PDSN/PGW 536'. The PDSN/PGW 536' in turn delivers the multiplexed data packet(s) to its respective target Node B(s) for transmission to target UE(s) via IP unicast, 920C. At least one target UE 522 receives and decodes the header of the multiplexed data packet, 925C. After the decoding of 925C, 930C through 940C correspond to 945A through 955A of FIG. 9A and as such will not be described further for the sake of brevity.

Figure 10A:
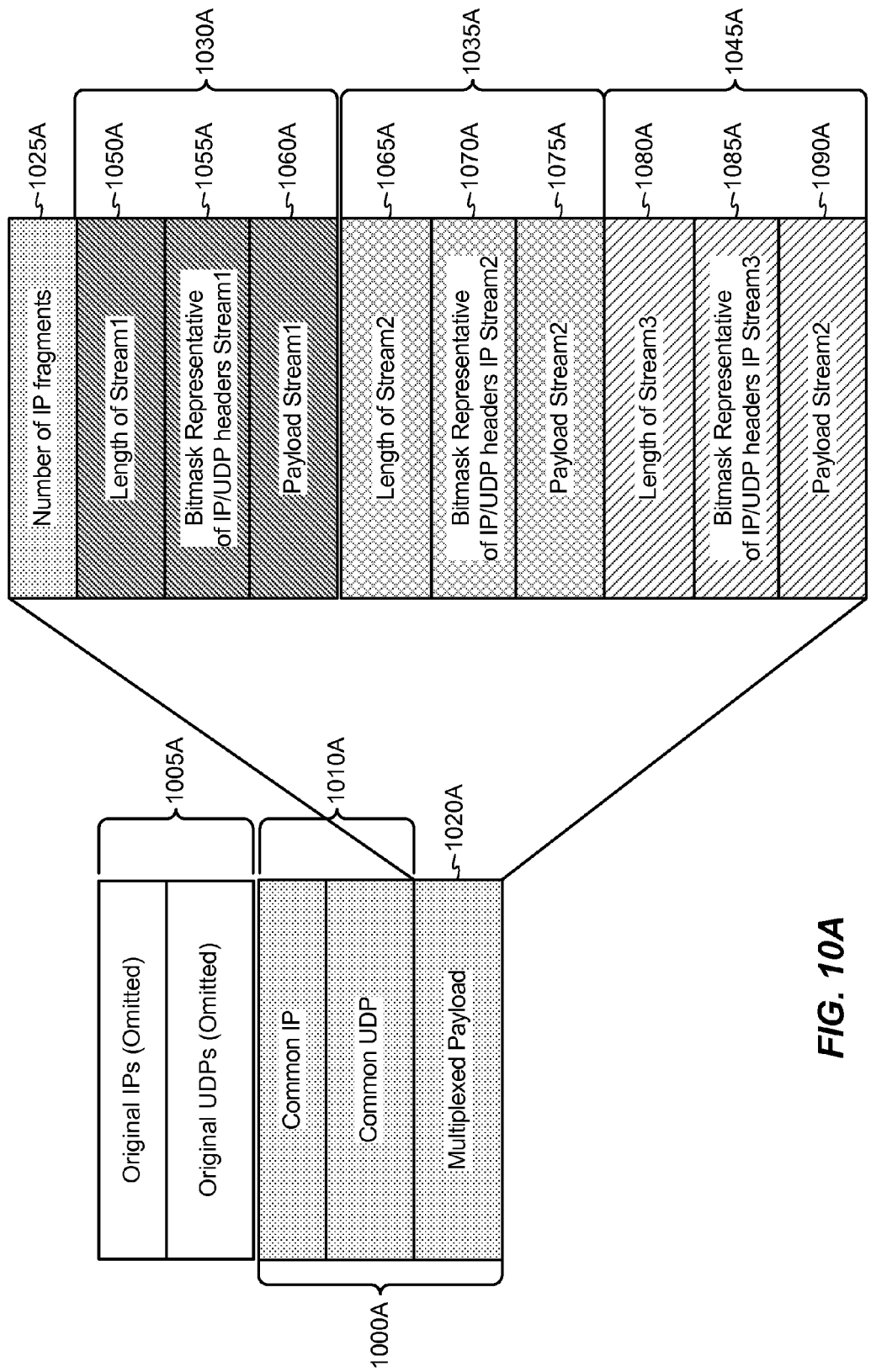
FIG. 10A illustrates an alternative configuration for the merged or multiplexed packets from FIG. 9B or 9D in accordance with an embodiment of the invention.

FIG. 10A illustrates an alternative configuration for the merged or multiplexed packets 955B and 955D from FIG. 9B or 9D. Referring to FIG. 10A, similar to the merged or multiplexed packets 955B and 955D, the merged or multiplexed packet 1000A of FIG. 10 omits the original IP/UDP addresses 1005A of the incoming data packets being multiplexed by the steam multiplexer 800 and instead includes common IP/UDP addresses 1010A, similar to 963B of FIG. 9B or 963D of FIG. 9D. The packet 1000A further includes a multiplexed payload portion 1020A, which includes a field 1025A that indicates the number of IP fragments (i.e., the number of different streams with payload portions in the packet) in the multiplexed payload portion 1020A. In the example of FIG. 10A, assume that the packet 1000A includes three (3) IP fragments 1030A, 1035A and 1040A that are associated with multicast streams 1, 2 and 3, respectively, from FIG. 9B.

The first IP fragment 1030A includes a length of stream field 1050A that indicates the length of the first IP fragment 1030A, a bitmask 1055A that is representative of the IP/UDP headers of the stream 1 packet that were stripped at 920A of FIG. 9A or 905C of FIG. 9C and the payload 1060A of the stream 1 packet (similar to 975B of FIG. 9B). The second IP fragment 1035A includes a length of stream field 1065A that indicates the length of the second IP fragment 1035A, a bitmask 1070A that is representative of the IP/UDP headers of the stream 2 packet that were stripped at 920A of FIG. 9A or 905C of FIG. 9C and the payload 1075A of the stream 2 packet (similar to 977B of FIG. 9B). The third IP fragment 1045A includes a length of stream field 1080A that indicates the length of the third IP fragment 1045A, a bitmask 1085A of the IP/UDP headers associated with the stream 3 packet that were stripped at 920A of FIG. 9A or 905C of FIG. 9C and the payload 1090A of the stream 3 packet (similar to 979B of FIG. 9B).

The bitmasks 1055A, 1070A and 1085A for the respective streams are similar to the bitmask 965B or 965D of FIGS. 9B and 9D, respectively. In an example, the bitmask 1055A can be mapped to the IP/UDP headers for stream 1 based on an association that can be ascertained by the target UE(s) of the merged or multiplexed packet based on information contained in a sync packet (e.g., 950B or FIG. 9B or 950D of FIG. 9D), and so on. Thus, the sync packet 950B can notify the target UE(s) that bitmask "1010111" is mapped to the IP/UDP addresses for stream 1, etc. Alternatively, the mapping between the bitmasks and the IP/UDP addresses can be self-contained in the merged or multiplexed packet, such as a header field that is separate from the common IP/UDP header portion 1010A used for the actual routing of the merged or multiplexed packet 1000A.

Figure 10B:
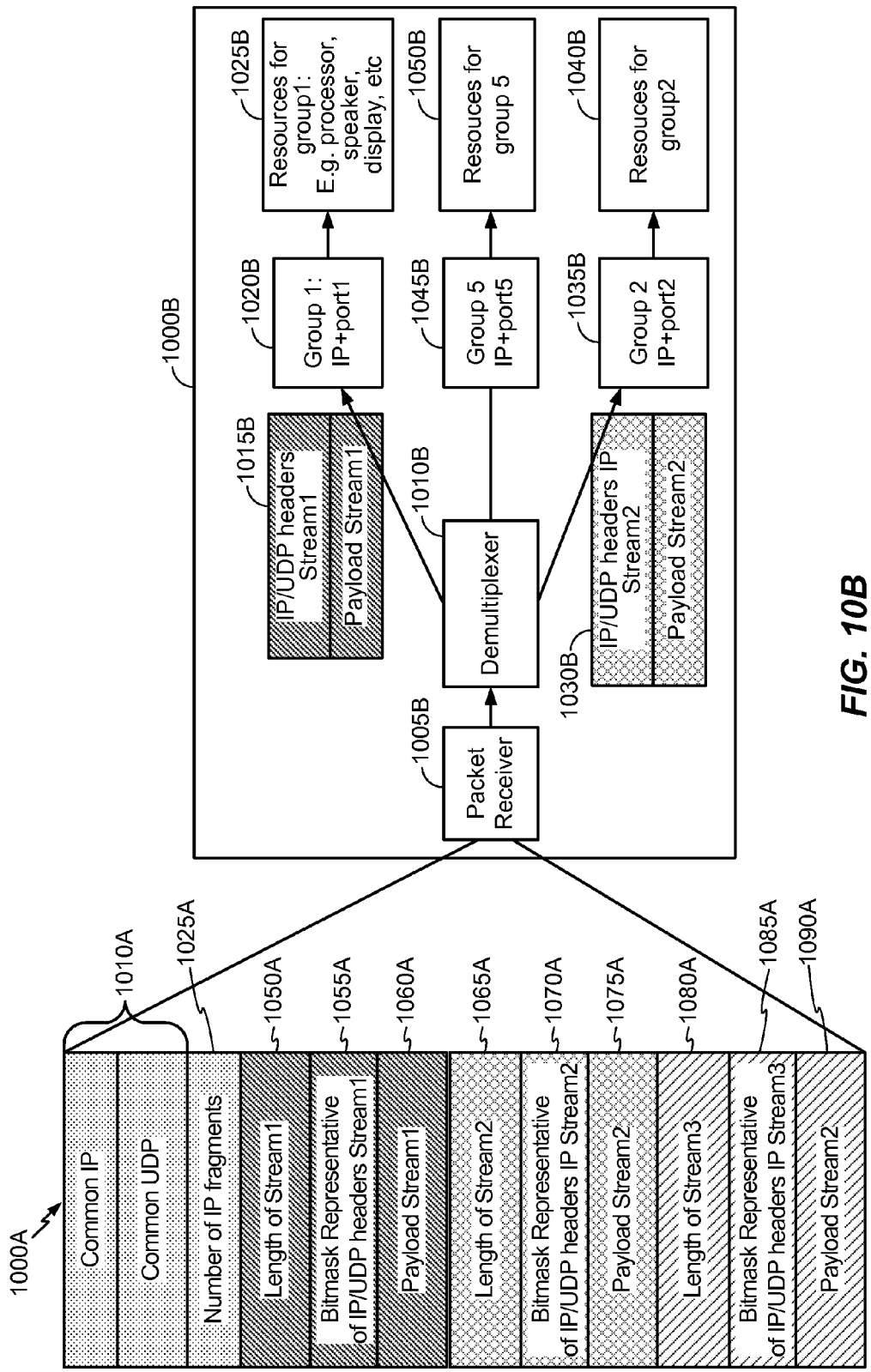
FIG. 10B illustrates a decoding operation that occurs during the process of FIG. 9A or FIG. 9C for a multiplexed data packet configured as shown in FIG. 10A in accordance with an embodiment of the invention.

FIG. 10B illustrates the decoding operation that occurs at 955A of FIG. 9A and/or 905C of FIG. 9C for a multiplexed data packet configured as shown in FIG. 10A in accordance with an embodiment of the invention. The decoding operation of FIG. 10B is shown via logical architecture 1000B of the UE performing the decoding. In FIG. 10B, the multiplexed data packet 1000A is received at a packet receiver 1005B of the UE, and is passed to a demultiplexer module 1010B. The demultiplexer module 1010B evaluates the multiplexed payload 1020A of the multiplexed data packet 1000A to reconstruct the IP/UDP headers and payload portions of the respective IP fragments in the multiplexed payload 1020A. For example, the demultiplexer module 1010B evaluates the number of IP fragment field 1025A to determine the number of IP fragments contained in the multiplexed payload 1020A, and then evaluates the length fields 1050A, 1065A and 1080A to extract the bits for each stream-specific payload portion (1060A, 1075A and 1090A) while identifying each stream-specific payload portion based on the bitmasks 1055A, 1070A and 1085A. The bitmasks 1055A, 1070A and 1085A are used to look-up the corresponding IP/UDP headers associated with the respective stream-specific payload portion.

After the demultiplexer module 1010B extracts the stream-specific payloads, the demultiplexer module 1010B passes the respective stream-specific payloads to stream-specific modules for further processing. In FIG. 10B, assume that multiplexed payload 1020A includes stream specific payload portions for streams 1, 2 and 3, that the UE is interested in streams 1 and 2 but is not interested in stream 3, and that the UE is also interested in stream 5. Under these assumptions, the demultiplexer module 1010A passes extracted information 1015B for stream 1 to an IP and port number module 1020B for stream 1 which in turn sends payload media for stream 1 to device resources 1025B assigned to stream 1 (e.g., a processor, speakers, a display, etc.), and the demultiplexer module 1010A also passes extracted information 1030B for stream 2 to an IP and port number module 1035B for stream 2 which in turn sends payload media for stream 2 to device resources 1040B assigned to stream 2 (e.g., a processor, speakers, a display, etc.). Also shown in the logical architecture 1000B of the UE is an IP and port number module 1035B for stream 5 and device resources 1050B that are associated with media playback of stream 5. However, because the multiplexed packet 1000A does not include a payload portion for stream 5, no payload is passed to the IP and port number module 1035B for stream 5 and/or the device resources 1050B for processing and/or playback in FIG. 10B.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (E-MBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a network device that is configured to multiplex a set of streams into a single output stream for delivery to one or more target devices, comprising:
    obtaining a plurality of data packets that are each associated with one of a plurality of different streams, wherein each of the plurality of obtained data packets includes a header portion with stream-specific routing information;
    determining that the plurality of obtained data packets are to be delivered to a common target area;
    stripping the stream-specific routing information from the plurality of obtained data packets to produce a plurality of stream-specific payload portions;
    merging at least the stream-specific payload portions into a shared payload portion of a stream-multiplexed data packet that includes common routing information for the plurality of streams in a common header portion that overrides the stream-specific routing information from the header portions of the plurality of obtained data packets, wherein the stream-multiplexed data packet includes stream-mapping information that maps the stream-specific payload portions in the shared payload portion to the plurality of different streams; and
    delivering the stream-multiplexed data packet to a network entity that is configured to handle transmission of the stream-multiplexed data packet within the common target area.

2. The method of claim 1,
    wherein the stream-specific routing information for the plurality of obtained data packets correspond to different sets of Internet Protocol/User Datagram Protocol (IP/UDP) addresses, and
    wherein the common routing information for the stream-multiplexed data packet uses a single set of IP/UDP addresses.

3. The method of claim 1, further comprising:
    determining to transmit the plurality of obtained data packets to one or more target user equipments (UEs) in the common target area via an Internet Protocol (IP) multicasting protocol, and
    wherein the delivering delivers the stream-multiplexed data packet to a multicast network management node for IP multicast transmission within the common target area.

4. The method of claim 3, wherein the determination to transmit the plurality of obtained data packets to the one or more target UEs via the IP multicasting protocol is based upon a degree to which the one or more target UEs are geographically collocated within the common target area being at least equal to an IP multicasting threshold.

5. The method of claim 3, wherein the multicast network management node corresponds to a broadcast multicast service center (BM-SC).

6. The method of claim 1, further comprising:
    determining to transmit the plurality of obtained data packets to one or more target user equipments (UEs) in the common target area via an Internet Protocol (IP) unicasting protocol, and
    wherein the delivering delivers the stream-multiplexed data packet to a unicast network management node for IP unicast transmission within the common target area.

7. The method of claim 6, wherein the determination to transmit the plurality of obtained data packets to the one or more target UEs via the IP unicasting protocol is based upon a degree to which the one or more target UEs are geographically collocated within the common target area being less than an IP multicasting threshold.

8. The method of claim 6, wherein the unicast network management node corresponds to a packet network serving node (PDSN) or packet data network gateway (PGW).

9. The method of claim 6, wherein the one or more target UEs includes a plurality of target UEs.

10. The method of claim 9, wherein two or more of the plurality of target UEs are expected to be interested in different sets of the plurality of different streams.

11. The method of claim 1, wherein the stream-mapping information corresponds to bitmask information that identifies, for each of the stream-specific payload portions in the shared payload portion, the associated stream with payload data in that stream-specific payload portion.

12. The method of claim 1, wherein two or more of the plurality of obtained data packets are targeted to different sets of target UEs.

13. The method of claim 1, further comprising:
transmitting a sync packet to one or more target user equipments (UEs) for the stream-multiplexed data packet,
wherein the sync packet indicates how the stream-mapping information is configured to map the stream-specific payload portions of the shared payload portion to the plurality of different streams.

14. The method of claim 13,
wherein the stream-mapping information corresponds to bitmask information that identifies, for each of the stream-specific payload portions of the shared payload portion, the associated stream with payload data in that stream-specific payload portion, and
wherein the sync packet indicates bitmask identifiers that are configured to be used in the bitmask information for identifying the plurality of different streams.

15. The method of claim 13, wherein the sync packet is retransmitted in response to changes to the stream-mapping information.

16. The method of claim 13, wherein the sync packet is transmitted in response to a given stream being removed from or added to the stream-multiplexed data packet.

17. The method of claim 1, wherein at least one of the plurality of different streams corresponds to a multicast stream.

18. The method of claim 17, wherein each of the plurality of different streams are associated with different evolved multimedia broadcast/multicast services (E-MBMS) services being carried in the common target area.

19. The method of claim 1, wherein at least one of the plurality of different streams corresponds to a unicast stream.

20. The method of claim 19, wherein at least one of the plurality of different streams corresponds to a multicast stream.

21. The method of claim 1, wherein at least one of the plurality of obtained data packets is to be delivered to the common target area and also at least one target area outside of the common target area, further comprising:
delivering the at least one data packet to the at least one target area outside of the common target area based on the at least one data packet's stream-specific routing information.

22. The method of claim 1,
wherein the merging further includes merging one or more additional payload portions for one or more other unicast and/or multicast streams being carried in the common target area into the stream-multiplexed data packet.

23. The method of claim 1, wherein the stream mapping information is contained in either (i) the common header portion of the stream-multiplexed data packet, or (ii) the shared payload portion of the stream-multiplexed data packet.

24. The method of claim 23, wherein the stream mapping information is contained the shared payload portion of the stream-multiplexed data packet.

25. The method of claim 24, wherein the shared payload portion includes:
a field that indicates a number of the stream-specific payload portions in the shared payload portion of the stream-multiplexed packet, and
each of the stream-specific payload portions in association with (i) a length field indicating a length of the stream-specific payload portion, and (ii) the stream-specific mapping information for the associated stream.

26. A method of operating a target user equipment (UE) that is configured to monitor one or more streams, comprising:
receiving a stream-multiplexed data packet that includes a shared payload portion that includes stream-specific payload portions that are associated with a plurality of different streams and a common header portion for the plurality of different streams, wherein the stream-multiplexed data packet includes stream-mapping information that maps the stream-specific payload portions of the shared payload portion to the plurality of different streams;
determining whether one or more of the plurality of different streams are relevant to the target UE based on the stream-mapping information; and
selectively decoding and processing the stream-specific payload portions corresponding to the one or more streams based on the determination.

27. The method of claim 26,
wherein the determining includes:
identifying a set of streams from the plurality of different streams that are relevant to the target UE based on the stream-mapping information, and
wherein the selectively decoding and processing includes:
decoding and processing the stream-specific payload portions corresponding to the identified set of streams.

28. The method of claim 21,
wherein the determining includes:
determining that none of the plurality of different streams are relevant to the target UE based on the stream-mapping information, and
wherein the selectively decoding and processing includes:
refraining from decoding and processing any of the stream-specific payload portions in the stream-multiplexed data packet based on the determination that none of the plurality of different streams are relevant to the target UE.

29. The method of claim 26,
wherein the common header portion includes a single set of Internet Protocol/User Datagram Protocol (IP/UDP)/addresses.

30. The method of claim 26, wherein the receiving receives the stream-multiplexed data packet via an Internet Protocol (IP) multicasting protocol from a multicast network management node.

31. The method of claim 30, wherein the target UE is geographically collocated with a number of other target UEs that are each expected to be interested in one or more of the plurality of different streams and which collectively have a degree of geographic collocation that is at least equal to an IP multicasting threshold.

32. The method of claim 30, wherein the multicast network management node corresponds to a broadcast multicast service center (BM-SC).

33. The method of claim 26, wherein the receiving receives the stream-multiplexed data packet via an Internet Protocol (IP) unicasting protocol from a unicast network management node.

34. The method of claim 33, wherein the target UE is geographically collocated with a number of other target UEs that are each expected to be interested in one or more of the plurality of different streams and which collectively have a degree of geographic collocation that is less than an IP multicasting threshold.

35. The method of claim 33, wherein the unicast network management node corresponds to a packet network serving node (PDSN) or packet data network gateway (PGW).

36. The method of claim 21,
wherein less than all of the plurality of different streams are determined to be relevant to the target UE, and
wherein any non-relevant multicast streams for the target UE are relevant to one or more different target UEs in a common target area that includes both the target UE and the one or more different target UEs.

37. The method of claim 26, wherein the stream-mapping information corresponds to bitmask information that identifies, for each of the stream-specific payload portions in the shared payload portion, the associated stream with payload data in that stream-specific payload portion.

38. The method of claim 26, further comprising:
receiving a sync packet for the stream-multiplexed data packet,
wherein the sync packet indicates how the stream-mapping information is configured to map the stream-specific payload portions of the shared payload portion to the plurality of different streams.

39. The method of claim 38,
wherein the stream-mapping information corresponds to bitmask information that identifies, for each of the stream-specific payload portions of the shared payload portion, the associated stream with payload data in that stream-specific payload portion, and
wherein the sync packet indicates bitmask identifiers that are configured to be used in the bitmask information for identifying the plurality of different streams.

40. The method of claim 38, wherein the sync packet is received in response to changes to the stream-mapping information.

41. The method of claim 38, wherein the sync packet is received in response to a given stream being removed from or added to the stream-multiplexed packet.

42. The method of claim 26, wherein at least one of the plurality of different streams corresponds to a multicast stream.

43. The method of claim 42, wherein each of the plurality of different streams are associated with different evolved multimedia broadcast/multicast services (E-MBMS) services being carried in a common target area.

44. The method of claim 26, wherein the stream mapping information is contained in either (i) the common header portion of the stream-multiplexed data packet, or (ii) the shared payload portion of the stream-multiplexed data packet.

45. The method of claim 44, wherein the stream mapping information is contained the shared payload portion of the stream-multiplexed data packet.

46. The method of claim 45, wherein the shared payload portion includes:
a field that indicates a number of the stream-specific payload portions in the shared payload portion of the stream-multiplexed packet, and
each of the stream-specific payload portions in association with (i) a length field indicating a length of the stream-specific payload portion, and (ii) the stream-specific mapping information for the associated stream.

47. The method of claim 26, wherein the selectively decoding and processing includes:
demultiplexing the shared payload portion to extract each of the stream-specific payload portions,
mapping each of the extracted stream-specific payload portions to the plurality of different streams using the stream-mapping information,
identifying at least one of the extracted stream-specific payload portions that is mapped to at least one stream determined to be relevant to the target UE, and
decoding and processing the identified at least one stream-specific payload portion.

48. The method of claim 47,
wherein the determining determines that at least one of the plurality of different streams is relevant to the target UE,
wherein the target UE is provisioned with Internet Protocol/User Datagram Protocol (IP/UDP)/addresses for the at least one relevant stream,
wherein the mapping produces IP/UDP addresses for the plurality of different streams, and
wherein the identified at least one stream-specific payload portion includes any stream-specific payload with IP/UDP addresses that match any of the provisioned IP/UDP addresses.

49. A network device that is configured to multiplex a set of streams into a single output stream for delivery to one or more target devices, comprising:
means for obtaining a plurality of data packets that are each associated with one of a plurality of different streams, wherein each of the plurality of obtained data packets includes a header portion with stream-specific routing information;
means for determining that the plurality of obtained data packets are to be delivered to a common target area;
means for stripping the stream-specific routing information from the plurality of obtained data packets to produce a plurality of stream-specific payload portions;
means for merging at least the stream-specific payload portions into a shared payload portion of a stream-multiplexed data packet that includes common routing information for the plurality of streams in a common header portion that overrides the stream-specific routing information from the header portions of the plurality of obtained data packets, wherein the stream-multiplexed data packet includes stream-mapping information that maps the stream-specific payload portions in the shared payload portion to the plurality of different streams; and
means for delivering the stream-multiplexed data packet to a network entity that is configured to handle transmission of the stream-multiplexed data packet within the common target area.

50. A target user equipment (UE) that is configured to monitor one or more streams, comprising:
means for receiving a stream-multiplexed data packet that includes a shared payload portion that includes stream-specific payload portions that are associated with a plurality of different streams and a common header portion for the plurality of different streams, wherein the stream-multiplexed data packet includes stream-mapping information that maps the stream-specific payload portions of the shared payload portion to the plurality of different streams;

means for determining whether one or more of the plurality of different streams are relevant to the target UE based on the stream-mapping information; and means for selectively decoding and processing the stream-specific payload portions corresponding to the one or more streams based on the determination.

51. A network device that is configured to multiplex a set of streams into a single output stream for delivery to one or more target devices, comprising:
   logic configured to obtain a plurality of data packets that are each associated with one of a plurality of different streams, wherein each of the plurality of obtained data packets includes a header portion with stream-specific routing information;
   logic configured to determine that the plurality of obtained data packets are to be delivered to a common target area;
   logic configured to strip the stream-specific routing information from the plurality of obtained data packets to produce a plurality of stream-specific payload portions;
   logic configured to merge at least the stream-specific payload portions into a shared payload portion of a stream-multiplexed data packet that includes common routing information for the plurality of streams in a common header portion that overrides the stream-specific routing information from the header portions of the plurality of obtained data packets, wherein the stream-multiplexed data packet includes stream-mapping information that maps the stream-specific payload portions in the shared payload portion to the plurality of different streams; and
   logic configured to deliver the stream-multiplexed data packet to a network entity that is configured to handle transmission of the stream-multiplexed data packet within the common target area.

52. A target user equipment (UE) that is configured to monitor one or more streams, comprising:
   logic configured to receive a stream-multiplexed data packet that includes a shared payload portion that includes stream-specific payload portions that are associated with a plurality of different streams and a common header portion for the plurality of different streams, wherein the stream-multiplexed data packet includes stream-mapping information that maps the stream-specific payload portions of the shared payload portion to the plurality of different streams;
   logic configured to determine whether one or more of the plurality of different streams are relevant to the target UE based on the stream-mapping information; and
   logic configured to selectively decode and process the stream-specific payload portions corresponding to the one or more streams based on the determination.

53. A non-transitory computer-readable medium containing instructions stored thereon, which, when executed by a network device that is configured to multiplex a set of streams into a single output stream for delivery to one or more target devices, cause the network device to perform operations, the instructions comprising:
   at least one instruction for causing the network device to obtain a plurality of data packets that are each associated with one of a plurality of different streams, wherein each of the plurality of obtained data packets includes a header portion with stream-specific routing information;
   at least one instruction for causing the network device to determine that the plurality of obtained data packets are to be delivered to a common target area;
   at least one instruction for causing the network device to strip the stream-specific routing information from the plurality of obtained data packets to produce a plurality of stream-specific payload portions;
   at least one instruction for causing the network device to merge at least the stream-specific payload portions into a shared payload portion of a stream-multiplexed data packet that includes common routing information for the plurality of streams in a common header portion that overrides the stream-specific routing information from the header portions of the plurality of obtained data packets, wherein the stream-multiplexed data packet includes stream-mapping information that maps the stream-specific payload portions in the shared payload portion to the plurality of different streams; and
   at least one instruction for causing the network device to deliver the stream-multiplexed data packet to a network entity that is configured to handle transmission of the stream-multiplexed data packet within the common target area.

54. A non-transitory computer-readable medium containing instructions stored thereon, which, when executed by a target user equipment (UE) that is configured to monitor one or more streams, cause the target UE to perform operations, the instructions comprising:
   at least one instruction for causing the target UE to receive a stream-multiplexed data packet that includes a shared payload portion that includes stream-specific payload portions that are associated with a plurality of different streams and a common header portion for the plurality of different streams, wherein the stream-multiplexed data packet includes stream-mapping information that maps the stream-specific payload portions of the shared payload portion to the plurality of different streams;
   at least one instruction for causing the target UE to determine whether one or more of the plurality of different streams are relevant to the target UE based on the stream-mapping information; and
   at least one instruction for causing the target UE to selectively decode and process the stream-specific payload portions corresponding to the one or more streams based on the determination.

* * * * *